United States Patent
Konno et al.

(10) Patent No.: US 10,913,390 B2
(45) Date of Patent: Feb. 9, 2021

(54) VEHICLE PROXIMITY NOTIFICATION DEVICE AND VEHICLE PROXIMITY NOTIFICATION METHOD

(71) Applicant: PANASONIC INTELLECTUAL PROPERTY MANAGEMENT CO., LTD., Osaka (JP)

(72) Inventors: Fumiyasu Konno, Osaka (JP); Ichiro Ohno, Osaka (JP); Sinnosuke Nagasawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/820,265

(22) Filed: Mar. 16, 2020

(65) Prior Publication Data
US 2020/0215969 A1 Jul. 9, 2020

Related U.S. Application Data

(63) Continuation of application No. PCT/JP2018/031520, filed on Aug. 27, 2018.

(30) Foreign Application Priority Data

Sep. 21, 2017 (JP) .................................. 2017-180782

(51) Int. Cl.
*B60Q 5/00* (2006.01)
*G01S 15/931* (2020.01)

(52) U.S. Cl.
CPC ............ *B60Q 5/006* (2013.01); *G01S 15/931* (2013.01)

(58) Field of Classification Search
CPC ....... B60Q 5/006; B60Q 5/008; G01S 15/931; B60R 11/02; B60R 21/00; H04R 3/00
(Continued)

(56) References Cited

U.S. PATENT DOCUMENTS 5,796,847 A * 8/1998 Kaihotsu .................. H03G 3/32
381/108
9,409,516 B2 * 8/2016 Arita ...................... B60Q 5/008
(Continued)

FOREIGN PATENT DOCUMENTS

| JP | 05-208636 | 8/1993 |
| JP | 11-285093 | 10/1999 |

(Continued)

OTHER PUBLICATIONS

International Search Report issued in International Pat. Appl. No. PCT/JP2018/031520, dated Oct. 23, 2018.

*Primary Examiner* — Ojiako K Nwugo
(74) *Attorney, Agent, or Firm* — Greenblum & Bernstein, P.L.C.

(57) ABSTRACT

A vehicle proximity notification device that notifies proximity of a vehicle by causing a speaker disposed outside a vehicle interior of the vehicle to output a warning sound. The vehicle proximity notification device includes: a controller that, when a sound pressure of a sound collected by a microphone disposed outside the vehicle interior exceeds a first threshold, sets a sound pressure of the warning sound output by the speaker to a level lower than the sound pressure of the warning sound output by the speaker when the sound pressure of the sound collected by the microphone is lower than or equal to the first threshold.

6 Claims, 11 Drawing Sheets

(58) Field of Classification Search
USPC .......................................................... 340/435
See application file for complete search history.

(56) References Cited

U.S. PATENT DOCUMENTS

| | | | |
|---|---|---|---|
| 9,643,537 B2* | 5/2017 | Kwon | B60Q 5/008 |
| 2012/0130580 A1 | 5/2012 | Omote et al. | |
| 2012/0166042 A1* | 6/2012 | Kokido | B60Q 5/008 |
| | | | 701/36 |
| 2012/0299716 A1 | 11/2012 | Yoshino et al. | |
| 2013/0063258 A1* | 3/2013 | Mitsugi | B60Q 5/008 |
| | | | 340/463 |
| 2013/0223643 A1* | 8/2013 | Sato | G08B 3/10 |
| | | | 381/86 |
| 2017/0001558 A1 | 1/2017 | Kwon | |
| 2017/0322558 A1* | 11/2017 | Teshima | B60W 30/18109 |

FOREIGN PATENT DOCUMENTS

| | | |
|---|---|---|
| JP | 2005-343360 | 12/2005 |
| JP | 2011-246121 | 12/2011 |
| JP | 2014-091419 | 5/2014 |
| JP | 5728932 | 6/2015 |
| JP | 2017-013786 | 1/2017 |
| WO | 2011/070630 | 6/2011 |
| WO | 2012/023170 | 2/2012 |

* cited by examiner

VEHICLE PROXIMITY NOTIFICATION DEVICE AND VEHICLE PROXIMITY NOTIFICATION METHOD

CROSS REFERENCE TO RELATED APPLICATIONS

This is a continuation application of PCT International Application No. PCT/JP2018/031520 filed on Aug. 27, 2018, designating the United States of America, which is based on and claims priority of Japanese Patent Application No. 2017-180782 filed on Sep. 21, 2017.

BACKGROUND

1. Technical Field

The present disclosure relates to a vehicle proximity notification device that is mounted in a vehicle, and outputs a warning sound notifying proximity of the vehicle to the outside, and a vehicle proximity notification method.

2. Description of the Related Art

Electric vehicles and hybrid vehicles are low-noise vehicles, and thus have a problem that it is difficult for a pedestrian or the like to notice proximity of such a vehicle when the vehicle travels at a low speed with a low road noise of the vehicle itself. In view of the above, low-noise vehicles such as electric vehicles and hybrid vehicles are provided with a vehicle proximity notification device that generates, during travelling, a warning sound which is a continuous sound that reminds a hearer of a vehicle in a travelling state, thereby alerting a pedestrian or the like to proximity of the vehicle (see, for example, Japanese Unexamined Patent Application Publication No. 05-208636 and Japanese Unexamined Patent Application Publication No. 11-285093).

SUMMARY

However, the vehicle proximity notification devices according to Japanese Unexamined Patent Application Publication No. 05-208636 and Japanese Unexamined Patent Application Publication No. 11-285093 can be improved upon.

A vehicle proximity notification device according to one aspect of the present disclosure is a vehicle proximity notification device that notifies proximity of a vehicle by causing a speaker disposed outside a vehicle interior of the vehicle to output a warning sound. The vehicle proximity notification device includes: a controller that, when a sound pressure of a sound collected by a microphone disposed outside the vehicle interior exceeds a first threshold, sets a sound pressure of the warning sound output by the speaker to a level lower than the sound pressure of the warning sound output by the speaker when the sound pressure of the sound collected by the microphone is lower than or equal to the first threshold.

It should to be noted that the above-described generic or specific aspect may be implemented using a system, a method, an integrated circuit, a computer program, or a non-transitory computer-readable recording medium such as a compact disc read only memory (CD-ROM), and may also be implemented by any combination of systems, methods, integrated circuits, computer programs, and recording media.

A vehicle proximity notification device according to one aspect of the present disclosure is capable of improving upon the above related art.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

Figure 1:
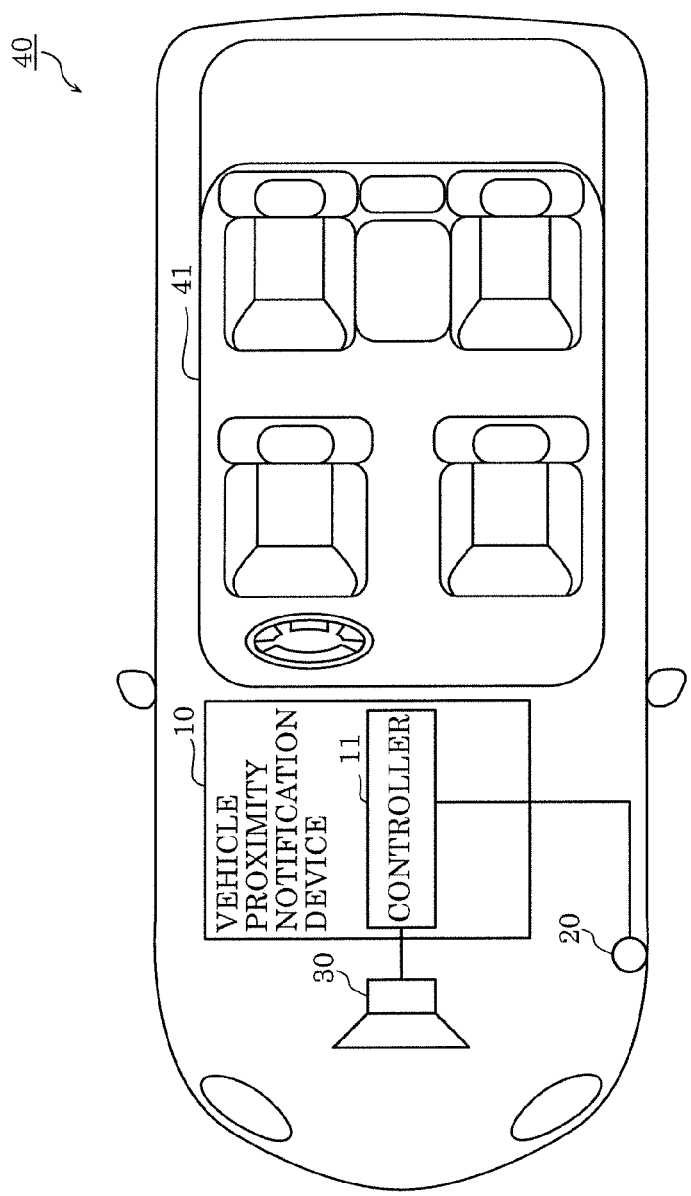
FIG. 1 is a schematic diagram illustrating a vehicle including a vehicle proximity notification device according to an embodiment.

DETAILED DESCRIPTION OF THE EMBODIMENT (Underlying Knowledge Forming the Basis of the Present Disclosure)

Conventional vehicle proximity notification devices include a speaker that generates a warning sound, a sound source that outputs a signal corresponding to the warning sound, and an amplifier that amplifies the signal output from the sound source and outputs the amplified signal to the speaker.

The vehicle warning sound source described in Japanese Unexamined Patent Application Publication No. 05-208636 includes an out-vehicle speaker, an in-vehicle speaker, a microphone provided at a location where a sound reduction is desired in a vehicle, and an adaptive type controller. The vehicle warning sound source generates a warning sound from the out-vehicle speaker, using a reference signal via an amplifier. At this time, the adaptive type controller identifies a reverse transmission characteristic relating to a transmission characteristic of an in-vehicle space transmission system, based on the reference signal and an input of the microphone, and controls an output sound of the in-vehicle speaker via the amplifier so as to minimize the input of the microphone.

In addition, the in-vehicle warning sound device described in Japanese Unexamined Patent Application Publication No. 11-285093 generates a control sound for controlling a directivity characteristic of a warning sound, and changes the directivity characteristic of a warning sound into a desired characteristic by performing signal processing.

In this manner, it is possible to notify a pedestrian or the like of proximity of a vehicle, by generating a warning sound to the outside of the vehicle. However, a warning sound that notifies a pedestrian of proximity of a vehicle could also provoke an unpleasant feeling of the pedestrian. Furthermore, since a warning sound is transmitted to the inside of the vehicle as well, the warning sound could also provoke an unpleasant feeling of not only the pedestrian but also a person inside the vehicle. In order to control a warning sound transmitted to the inside of a vehicle, it is necessary to provide an additional device such as a microphone, etc. or to perform signal processing on a signal corresponding to the warning sound to generate a control sound. It is thus difficult to reduce an unpleasant feeling given to a person inside the vehicle by easily controlling a warning sound.

As to warning sounds output by low-noise vehicles such as electric vehicles and hybrid vehicles, regulations for a minimum sound pressure level is under consideration by the National Highway Traffics Safety Administration (NHTSA). For example, a minimum sound pressure level is defined for 8 frequency bands each of which has one-third octave, and it is necessary that a warning sound having a sound pressure level higher than or equal to the minimum sound pressure level is output when measured by a predetermined measurement method. Accordingly, it is not possible to set the sound pressure of warning sounds to a level lower than the minimum sound pressure level. In view of the above-described circumstances, it is desired to provide a technique for reducing an unpleasant feeling given to a person inside the vehicle while outputting a warning sound higher than or equal to the minimum sound pressure value.

The following embodiment describes a vehicle proximity notification device capable of easily outputting a warning sound which is less unpleasant to a person in the vehicle, while ensuring a necessary sound pressure.

A vehicle proximity notification device according to one aspect of the present disclosure is a vehicle proximity notification device that notifies proximity of a vehicle by causing a speaker disposed outside a vehicle interior of the vehicle to output a warning sound. The vehicle proximity notification device includes: a controller that, when a sound pressure of a sound collected by a microphone disposed outside the vehicle interior exceeds a first threshold, sets a sound pressure of the warning sound output by the speaker to a level lower than the sound pressure of the warning sound output by the speaker when the sound pressure of the sound collected by the microphone is lower than or equal to the first threshold.

According to this, it is possible to determine that a sound is sufficiently generated from a vehicle without outputting a warning sound from a speaker, by using a sound pressure of a sound collected by a microphone. It is thus possible to set a sound pressure of a warning sound output by the speaker to a low level when a sound is sufficiently generated from the vehicle. As a result, it is possible to output a warning sound which is less unpleasant to a person in the vehicle, while securing a necessary sound pressure. In addition, since it is possible to set a sound pressure of a warning sound to a low level according to the circumstances, power consumption required for outputting a warning sound can be reduced compared to the case where a sound pressure of a warning sound is not set to a low level.

In addition, the controller may: determine whether the sound pressure of the sound collected by the microphone exceeds the first threshold in a low frequency domain that is a range of frequencies lower than a predetermined frequency; when it is determined that the sound pressure of the sound collected by the microphone is lower than or equal to the first threshold in the low frequency domain, cause the speaker to output, as the warning sound, a first sound having a first frequency characteristic which is that a sound pressure at a first frequency included in the low frequency domain is a first sound pressure and a sound pressure at a second frequency included in a high frequency domain is a second sound pressure, the high frequency domain being a range of frequencies higher than or equal to the predetermined frequency; and when it is determined that the sound pressure of the sound collected by the microphone exceeds the first threshold in the low frequency domain, cause the speaker to output, as the warning sound, a second sound having a second frequency characteristic which is that the sound pressure at the first frequency associated with the first frequency characteristic is adjusted to a third sound pressure that is lower than the first sound pressure.

According to this, the sound pressure of a warning sound in a low-frequency domain is reduced according to a sound pressure of a sound in the low-frequency domain which is likely to be generated as a result of travelling of a vehicle. As a result, it is possible to effectively reduce an unpleasant feeling given to a person inside the vehicle.

In addition, the controller may: filter the sound collected by the microphone to extract a predefined-range sound removed of a frequency domain in which the sound pressure of the warning sound exceeds a predetermined sound pressure; determine whether a sound pressure of the predefined-range sound exceeds the first threshold; when it is determined that the sound pressure of the predefined-range sound is lower than or equal to the first threshold, cause the speaker to output, as the warning sound, a first sound having a first frequency characteristic which is that a sound pressure at a first frequency included in a low frequency domain is a first sound pressure and a sound pressure at a second frequency included in a high frequency domain is a second sound pressure, the low frequency domain being a range of frequencies lower than a predetermined frequency, the high frequency domain being a range of frequencies higher than or equal to the predetermined frequency; and when it is determined that the sound pressure of the predefined-range sound exceeds the first threshold, cause the speaker to output, as the warning sound, a second sound having a second frequency characteristic which is that the sound pressure at the first frequency associated with the first frequency characteristic is adjusted to a third sound pressure that is lower than the first sound pressure.

According to this, since filtering processing is applied to a sound collected by a microphone, it is possible to reduce a sound pressure of a warning sound in a low frequency domain according to a sound pressure of a sound being generated from a vehicle other than a sound output from a speaker. According to this, it is possible to effectively reduce an unpleasant feeling given to a person inside the vehicle, while securing a necessary sound pressure.

In addition, the controller may, when it is determined that the sound pressure of the predefined-range sound is lower than or equal to the first threshold and exceeds a second threshold that is lower than the first threshold, cause the speaker to output, as the warning sound, a sound in which (i)

a sound pressure at the first frequency is adjusted to the third sound pressure, and (ii) a sound pressure at the third frequency is adjusted to a level higher than the sound pressure at the third frequency when it is determined that the sound pressure of the predefined-range sound is lower than or equal to the second threshold, the third frequency being a frequency at which the sound pressure of the predefined-range sound exceeds the second threshold.

According to this, in the case where a sound pressure at the third frequency is between the second threshold and the first threshold, since a sound generated as a result of travelling of a vehicle is insufficient, a sound with a sound pressure that is increased until a sound pressure of a sound obtained by combining the sound generated as a result of travelling of the vehicle and the sound output from the speaker exceeds the first threshold is output, and thereby it is possible to generate a sound having a sufficient sound pressure from the vehicle. Accordingly, it is possible to reduce a sound pressure of a warning sound output from a speaker by the amount corresponding to a sound generated from the vehicle. According to this, it is possible to effectively reduce an unpleasant feeling given to a person inside the vehicle, while securing a necessary sound pressure.

In addition, the third sound pressure may be 0.

According to this, it is possible to effectively reduce an unpleasant feeling given to a person inside the vehicle.

In addition, the first frequency and the second frequency may be mutually nonadjacent frequencies among a plurality of frequencies divided for each one-third octave.

According to this, it is possible to effectively output a warning sound to a surrounding area of the vehicle.

It should be noted that these generic and specific aspects may be implemented using a system, a method, an integrated circuit, a computer program, or a non-transitory computer-readable recording medium such as a compact disc read only memory (CD-ROM), and may also be implemented by any combination of systems, methods, integrated circuits, computer programs, and recording media.

Hereinafter, an embodiment of the present disclosure will be described with reference to the drawings. It should be noted that the embodiment described below indicates one specific example of the present disclosure. The numerical values, shapes, materials, structural components, the arrangement and connection of the structural components, steps, the processing order of the steps, and so on, shown in the following embodiment are mere examples, and therefore do not limit the present disclosure. Therefore, among the structural components in the following embodiments, structural components not recited in any one of the independent claims are described as arbitrary structural components.

Embodiment

In the embodiment, a vehicle proximity notification device to be mounted in a vehicle will be described.

FIG. 1 is a schematic diagram illustrating a vehicle including a vehicle proximity notification device according to the embodiment.

Vehicle 40 is one example of a moving body apparatus, and includes vehicle proximity notification device 10, microphone 20, and speaker 30. More specifically, vehicle 40 is an automobile, but not strictly limited.

Microphone 20 is disposed outside vehicle interior 41 of vehicle 40, and obtains a sound in the vicinity of vehicle 40. Microphone 20 obtains a sound outside vehicle interior 41. Microphone 20 outputs an audio signal corresponding to the sound which has been obtained.

Speaker 30 outputs a sound according to the audio signal which has been output from vehicle proximity notification device 10. Speaker 30 is disposed outside the vehicle interior of vehicle 40, such as in an engine compartment. Accordingly, speaker 30 outputs a warning sound notifying proximity of vehicle 40 to the outside of vehicle 40. Speaker 30 has a function of converting an electric signal that is an audio signal to a mechanical vibration, and outputs a warning sound having a sound pressure based on the electric signal.

It should be noted that vehicle interior 41 in vehicle 40 is a space for accommodating an occupant of vehicle 40. In other words, vehicle interior 41 is a space in which an occupant of vehicle 40 is present.

[1-1. Configuration and Fundamental Operation]

Figure 2:
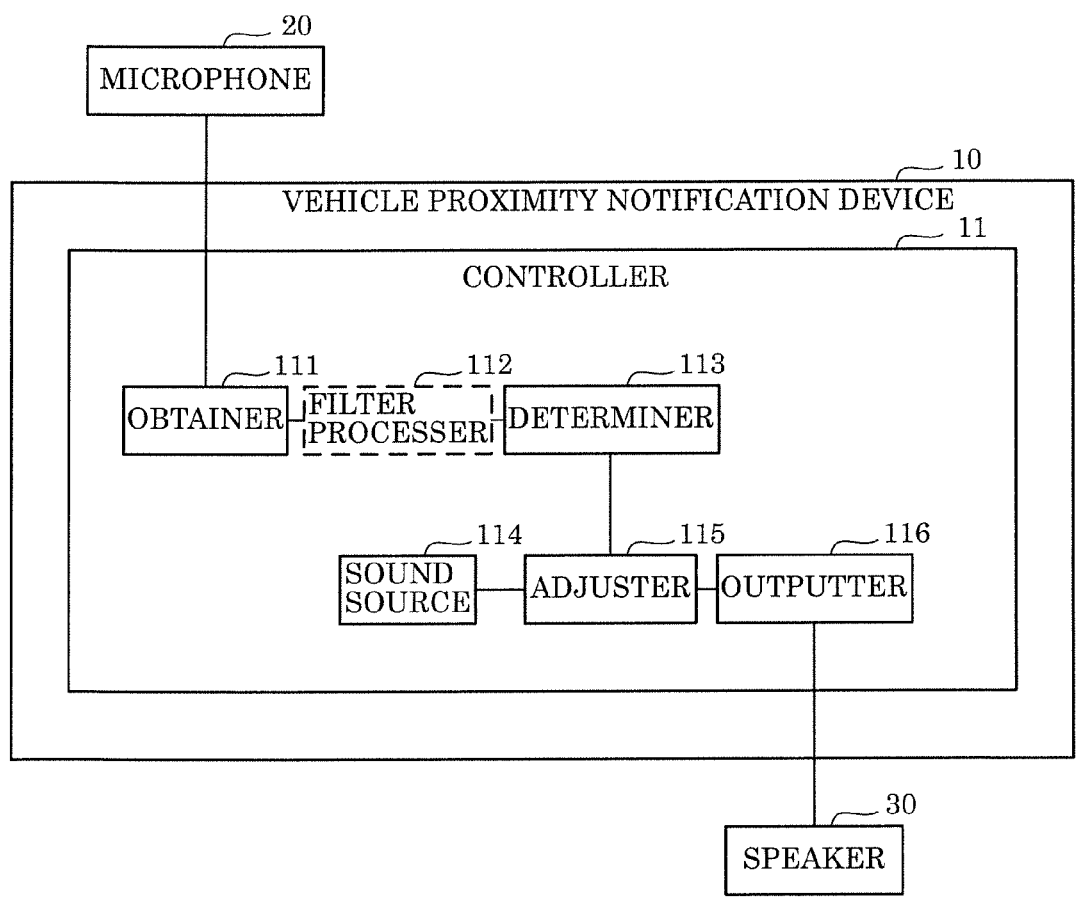
FIG. 2 is a functional block diagram of the vehicle proximity notification device.
Figure 3:
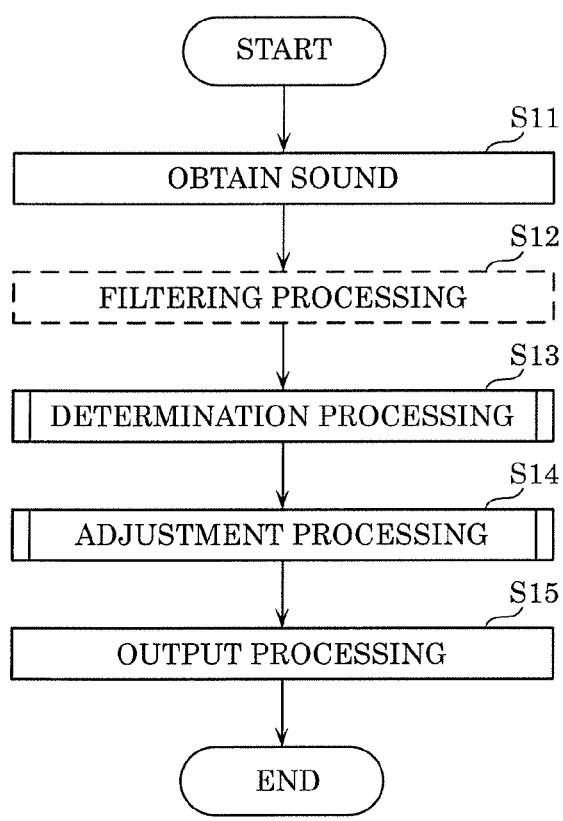
FIG. 3 is a flowchart of fundamental operations of the vehicle proximity notification device.

Next, a configuration of vehicle proximity notification device 10 will be described with reference to FIG. 2 and FIG. 3 in addition to FIG. 1. FIG. 2 is a functional block diagram of vehicle proximity notification device 10. FIG. 3 is a flowchart of fundamental operations of vehicle proximity notification device 10.

Vehicle proximity notification device 10 is a device that notifies a person in the vicinity of vehicle 40 of proximity of vehicle 40, by causing speaker 30 to output a warning sound.

Vehicle proximity notification device 10 includes controller 11 as illustrated in FIG. 1 and FIG. 2. When a sound pressure of a sound obtained by microphone 20 exceeds a first threshold, controller 11 sets a sound pressure of a sound to be output by speaker 30 to a level lower than a sound pressure of the sound to be output by speaker 30 when the sound pressure of the sound obtained by microphone 20 is lower than or equal to the first threshold. Controller 11 is implemented, for example, by a processor such as a digital signal processor (DSP). However, controller 11 may be implemented by a microcomputer or a dedicated circuit, or implemented by a combination of at least two of a processor, a microcomputer, and a dedicated circuit.

Controller 11 includes obtainer 111, filter processer 112, determiner 113, sound source 114, adjuster 115, and outputter 116, as illustrated in FIG. 2. Hereinafter, each of the components will be further described with reference to FIG. 1 to FIG. 3.

Obtainer 111 obtains an audio signal from microphone 20 (S11). More specifically, obtainer 111 is a circuit including an amplifier circuit that amplifies the audio signal obtained from microphone 20. It should be noted that a specific aspect of obtainer 111 is not limited to the above-described example.

Filter processer 112 performs a predetermined filtering processing on the audio signal obtained by obtainer 111 (S12). More specifically, filter processer 112 extracts an audio signal having a frequency characteristic of a predetermined frequency domain, using a combination of a low-pass filter and a high-pass filter. Filter processer 112 may extract an audio signal having a frequency characteristic of a predetermined frequency domain, using a bandpass filter. The frequency domain subjected to the extracting performed by filter processer 112 is, for example, a range from 160 Hz to 500 Hz.

As described above, filter processer 112 filters the sound collected by microphone 20 to extract a predefined-range sound removed of a frequency domain in which the sound pressure of the warning sound output by speaker 30 exceeds a predetermined sound pressure. The predetermined sound pressure may be lower than the first threshold. Filter processer 112 extracts a sound in the vicinity of vehicle 40 other than the warning sound output from speaker 30, by performing the filtering processing. Filter processer 112 extracts, for example, a sound generated from vehicle 40 as a result of traveling of vehicle 40. Filter processer 112 extracts, as the sound in the vicinity of vehicle 40, for example, a load noise generated as a result of a wheel of vehicle 40 rolling on a road, an engine sound generated as a result of an engine of vehicle 40 being driven, a motor sound generated as a result of a motor of vehicle 40 being driven, and other machine sounds generated as a result of rotating of rotating bodies of vehicle 40 such as a gear, a drive shaft, a turbocharger, etc. for use in driving a wheel.

Determiner 113 performs determination processing in which whether sound pressure of the predefined-range sound extracted by filter processor 112 exceeds a first threshold (S13). Determiner 113 performs the above-described determination processing by reading the first threshold stored in a memory which is not illustrated. The first threshold is a threshold determined by measuring in advance a sound generated from vehicle 40 at a prescribed position in the vicinity of vehicle 40, and is set to a value such that a sound pressure of the measured sound exceeds a prescribed sound pressure.

Figure 4:
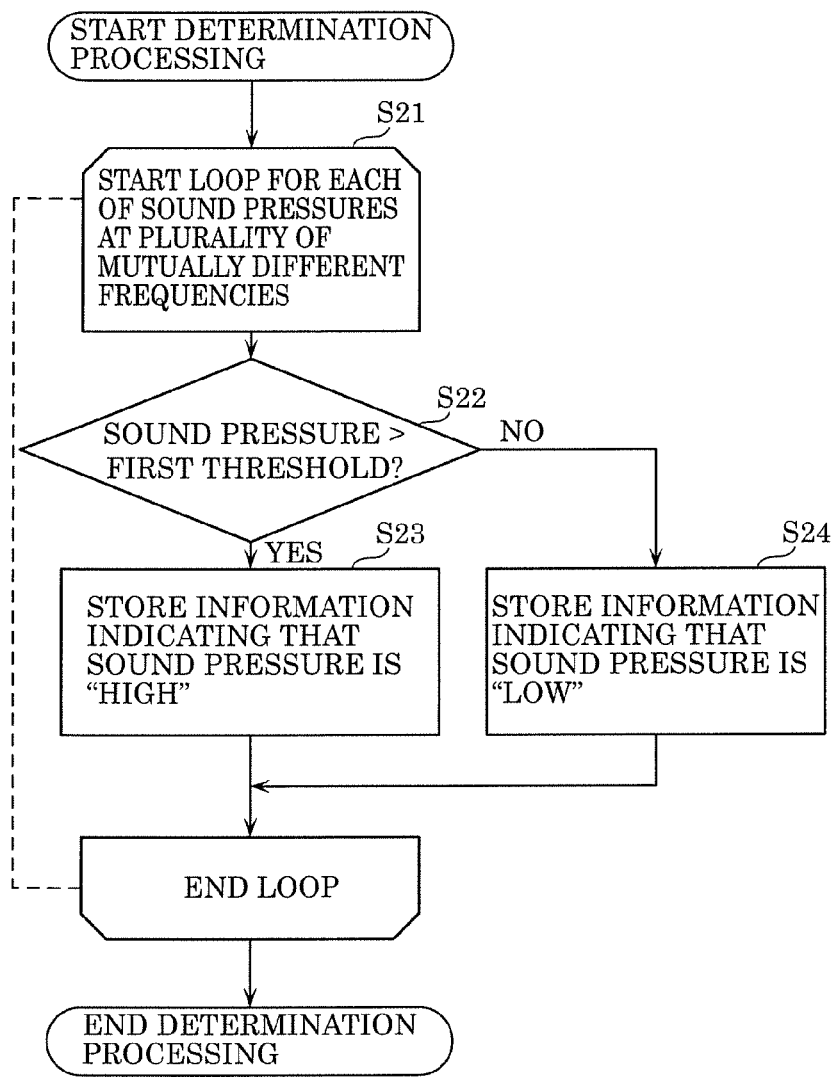
FIG. 4 is a flowchart illustrating the details of determination processing performed by a determiner.

FIG. 4 is a flowchart illustrating the details of the determination processing performed by determiner 113.

Determiner 113 starts a loop of executing Step S21 to Step S24 described below for each of a plurality of mutually different frequencies in a predetermined frequency domain of a predefined-range sound (S21). More specifically, determiner 113 analyzes the predefined-range sound, thereby starting the loop for the sound pressure at 160 Hz, 200 Hz, 250 Hz, 315 Hz, 400 Hz, and 500 Hz. It should be noted that the plurality of frequencies which are subject to the determination processing performed by determiner 113 only need to be partially included in the predetermined frequency domain, and may be included in a frequency domain outside the predetermined frequency domain. In addition, the plurality of frequencies are frequencies determined as a result of dividing a frequency domain at the one-third octave intervals. The plurality of frequencies at least include a frequency in a frequency domain having the one-third octave based on the lowest frequency in a predetermined frequency domain, and a frequency in a frequency domain having the one-third octave based on the highest frequency in the predetermined frequency domain. In other words, the plurality of frequencies are frequencies which can be identified by being evenly divided by the one-third octave intervals in the predetermined frequency domain.

Determiner 113 determines whether a sound pressure at one frequency among the plurality of frequencies exceeds the first threshold (S22).

When it is determined that the sound pressure at the one frequency exceeds the first threshold (Yes in S22), determiner 113 stores information indicating that the sound pressure at the one frequency is "high" (S23). In other words, in this case, determiner 113 stores, as information indicating that the sound pressure at the one frequency is "high", information indicating that the sound pressure exceeds the first threshold.

On the other hand, when it is determined that the sound pressure at the one frequency is lower than or equal to the first threshold (No in S22), determiner 113 stores information indicating that the sound pressure at the one frequency is "low" (S24). In other words, in this case, determiner 113 stores, as information indicating that the sound pressure at the one frequency is "low", information indicating that the sound pressure is lower than or equal to the first threshold.

Determiner 113 repeats Step S21 to Step S24 for a sound pressure at the next frequency on which the determination processing has not yet been performed among the sound pressures at the plurality of frequencies. When Step S21 to Step S24 have been performed on the sound pressures of all of the frequencies, determiner 113 terminates the loop to end the determination processing.

Figure 5:
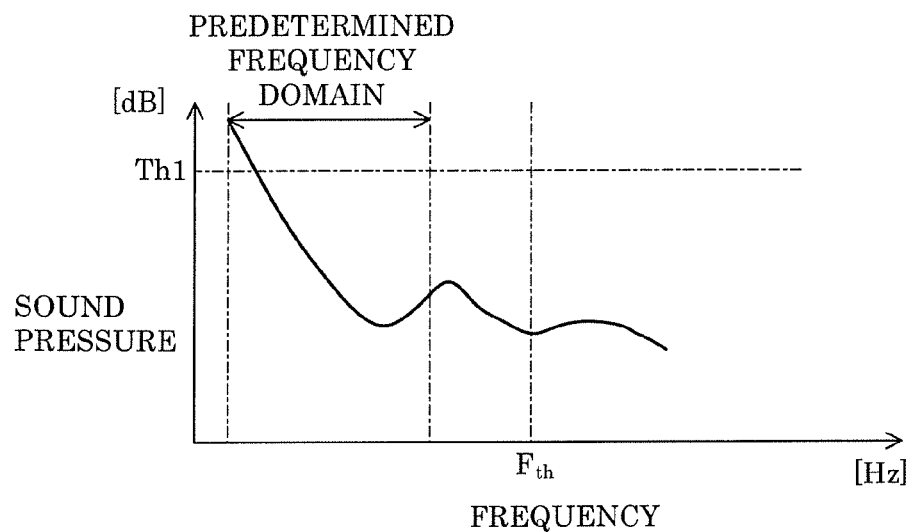
FIG. 5 is a diagram illustrating one example of a frequency characteristic of a fourth sound.

As described above, determiner 113 determines whether a fourth sound exceeds first threshold Th1 in a predetermined frequency domain. For example, when the fourth sound has a frequency characteristic illustrated in FIG. 5, determiner 113 determines that a sound pressure of the fourth sound exceeds first threshold Th1 in the predetermined frequency domain of the fourth sound. It should be noted that FIG. 5 is a diagram which illustrates one example of a frequency characteristic of the fourth sound.

It should be noted that, although it has been described that determiner 113 repeats Step S21 to Step S24 for each of sound pressures at the plurality of frequencies, the operation performed by determiner 113 is not limited to this example, and determiner 113 may determine whether a maximum value of a sound pressure exceeds first threshold Th1 in a predetermined frequency domain.

Figure 6:
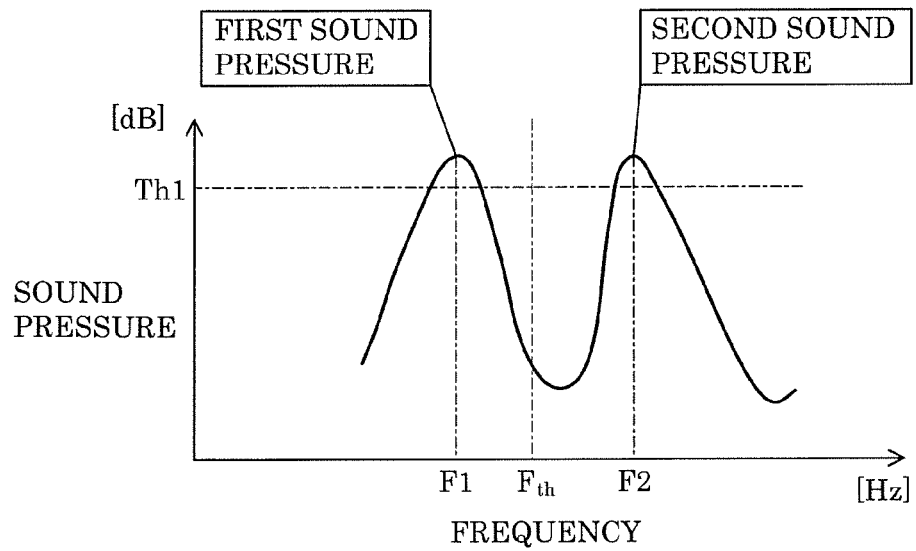
FIG. 6 is a diagram illustrating one example of a first frequency characteristic of a first sound.

Sound source 114 generates an electrical signal that is an audio signal corresponding to one warning sound that notifies, to the outside of vehicle 40, proximity of vehicle 40. The warning sound is, for example, an engine sound. A pseudo engine sound or an electronic sound is used for sound source 114, and a sound based on sound source 114 includes, for example, frequency components including a low sound portion of 300 Hz to 800 Hz and a high sound portion of 1 kHz to 5 kHz. Sound source 114 generates, as the warning sound, a first audio signal indicating a first sound having a first frequency characteristic. The first frequency characteristic is, for example, a sound pressure at first frequency F1 included in a low frequency domain that is a range of frequencies lower than a predetermined frequency Fth is the first sound pressure, and a sound pressure at second frequency F2 included in a high frequency domain that is a range of frequencies higher than or equal to the predetermined frequency Fth is the second sound pressure, as illustrated in FIG. 6. It should be noted that FIG. 6 is a diagram which illustrates one example of the first frequency characteristic of the first sound.

The predetermined frequency Fth is, for example, 1 kHz. In addition, first frequency F1 and second frequency F2 are mutually nonadjacent frequencies among a plurality of frequencies divided for each one-third octave. First frequency F1 is, for example, 630 Hz. Second frequency F2 is, for example, 1 kHz. In addition, the first sound pressure and the second sound pressure are, for example, at levels higher than first threshold Th1.

It should be noted that the warning sound output from sound source 114 may simply be a sine-wave signal sound, or the like.

Adjuster 115 adjusts, according to a result of determination performed by determiner 113, a sound pressure of the first audio signal obtained from sound source 114 (S14).

Figure 7:
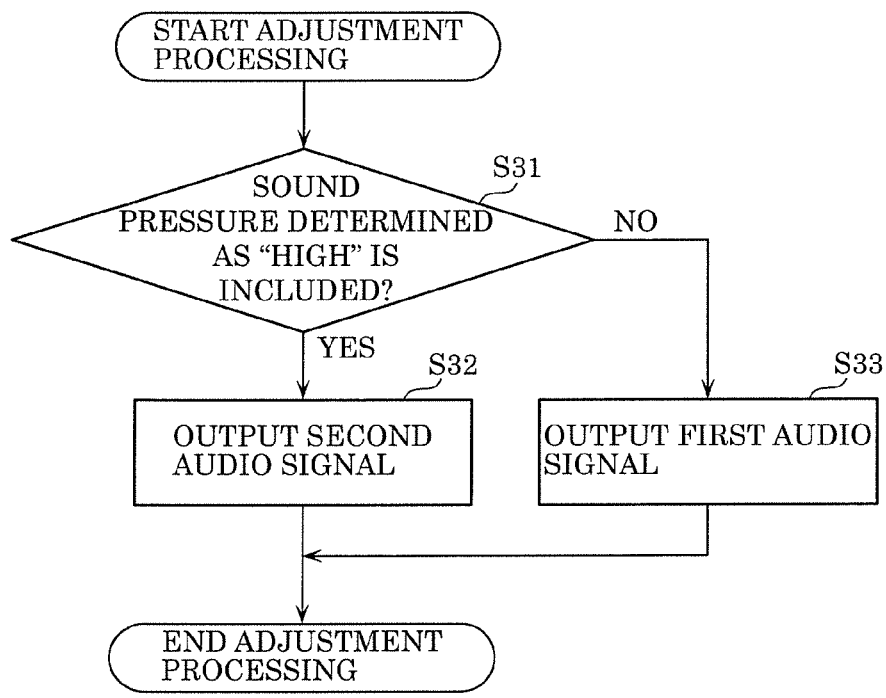
FIG. 7 is a flowchart illustrating the details of adjustment processing performed by an adjuster.

FIG. 7 is a flowchart illustrating the details of the adjustment processing performed by adjuster 115.

Adjuster 115 determines whether a sound pressure determined as "high" is included in the results of determination performed by determiner 113 (S31). In other words, adjuster 115 determines whether determiner 113 has determined that the sound pressure of the predefined-range sound exceeds first threshold Th1 or determiner 113 has determined that the sound pressure of the predefined-range sound is lower than or equal to first threshold Th1.

Figure 8:
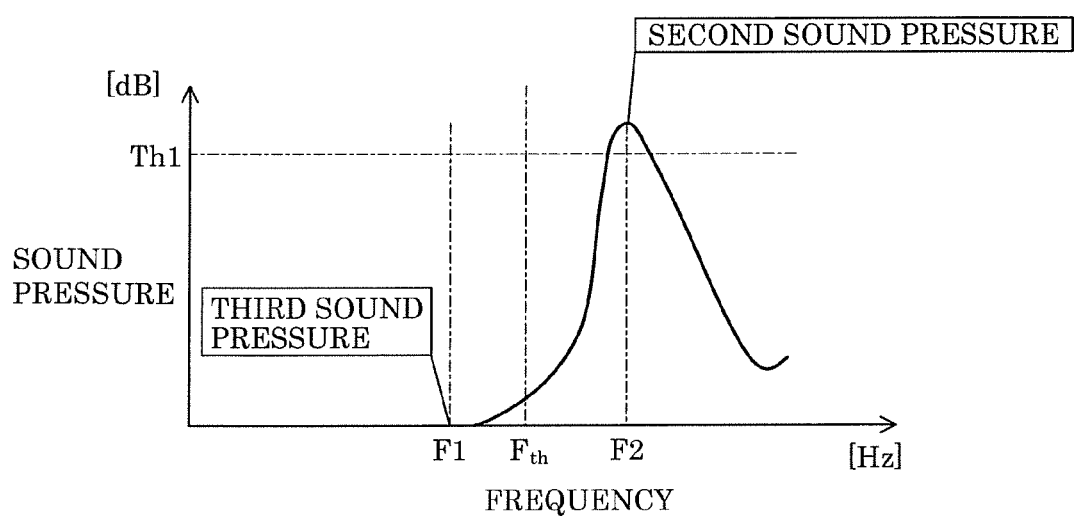
FIG. 8 is a diagram illustrating one example of a second frequency characteristic of a second sound.

When adjuster 115 determines that a sound pressure determined as "high" is included (Yes in S31), that is, when determiner 113 has determined that the sound pressure of the predefined-range sound exceeds first threshold Th1, adjuster 115 obtains the first audio signal from sound source 114, generates a second audio signal based on the obtained first audio signal, and outputs the generated second audio signal (S32). More specifically, adjuster 115 generates the second audio signal which indicates a second sound having a second frequency characteristic, by adjusting, using the first audio signal, a sound pressure at first frequency F1 associated with the first frequency characteristic of the first sound indicated by the first audio signal to a third sound pressure that is lower than the first sound pressure. In other words, the second frequency characteristic of the second sound is, as illustrated in FIG. 8, a frequency characteristic that is obtained as a result of the sound pressure at first frequency F1 associated with the first frequency characteristic being adjusted to the third sound pressure that is lower than the first sound pressure. It should be noted that the third sound pressure resulting from the adjustment performed on the first sound pressure by adjuster 115 may be 0. It should be noted that FIG. 8 is a diagram illustrating one example of the second frequency characteristic of the second sound.

On the other hand, when adjuster 115 determines that a sound pressure determined as "high" is not included (No in S31), that is, when determiner 113 has determined that the sound pressure of the predefined-range sound is lower than or equal to first threshold Th1, adjuster 115 obtains the first audio signal from sound source 114, and outputs the obtained first audio signal (S33).

Upon outputting the first audio signal or the second audio signal, adjuster 115 ends the adjustment processing.

Outputter 116 outputs the first audio signal or the second audio signal output by adjuster 115 (S15). More specifically, outputter 116 outputs the first audio signal or the second audio signal to speaker 30. Speaker 30 outputs the first sound based on the first audio signal or the second sound based on the second audio signal. For example, outputter 116 may amplify the first audio signal or the second audio signal at a predetermined amplification degree, and output the amplified audio signal to speaker 30. For example, outputter 116 may be implemented by an amplifier circuit.

[1-2. Advantageous Effects, Etc.]

With vehicle proximity notification device 10 according to the embodiment, it is possible to determine that a sound is sufficiently generated from a vehicle without outputting a warning sound from a speaker, by using a sound pressure of a sound collected by a microphone. It is thus possible to set a sound pressure of a warning sound output by the speaker to a low level when a sound is sufficiently generated from the vehicle. As a result, it is possible to output a warning sound which is less unpleasant to a person in the vehicle, while securing a necessary sound pressure. In addition, since it is possible to set a sound pressure of a warning sound to a low level according to the circumstances, power consumption required for outputting a warning sound can be reduced.

Figure 9:
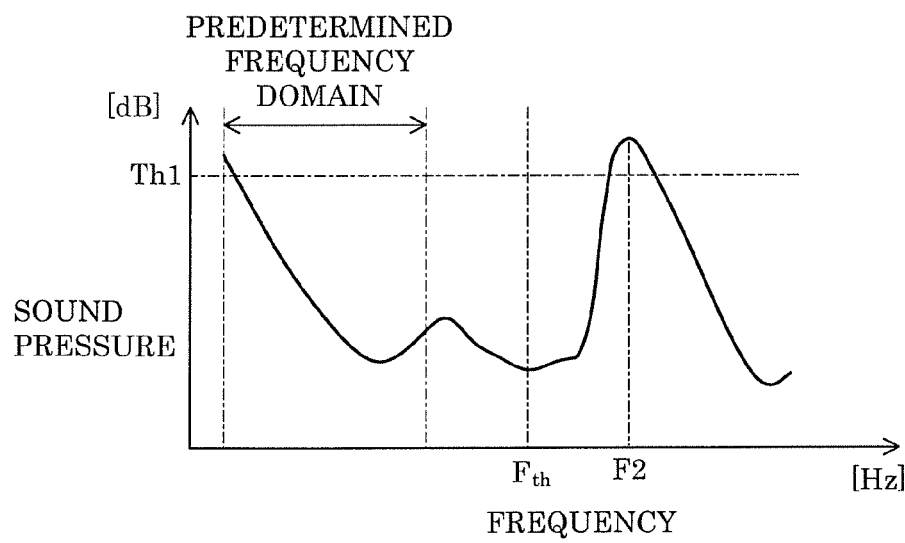
FIG. 9 is a diagram illustrating one example of a frequency characteristic of a synthesized sound that is output from the vehicle.

In addition, with vehicle proximity notification device 10, since filtering processing is applied to a sound collected by the microphone, it is possible to reduce a sound pressure of a warning sound in a low frequency domain according to a sound pressure of a sound being generated from the vehicle other than a sound output from a speaker. For example, when the fourth sound indicated in FIG. 5 is obtained, vehicle proximity notification device 10 is capable of generating, from vehicle 40, a synthesized sound having a frequency characteristic indicated in FIG. 9, by changing the sound output from speaker 30 from the first sound indicated in FIG. 6 to the second sound indicated in FIG. 8. In general, as the travelling speed of vehicle 40 becomes higher, a sound such as a load noise generated from speaker 30 increases. For that reason, by using a sound generated as a result of travelling of vehicle 40, it is possible to output a sound having a sufficient sound pressure to the surrounding area of vehicle 40 even when the sound pressure of a sound that is output from speaker 30 is reduced. According to this, it is possible to output a warning sound with effectively reduced unpleasant feeling given to a person inside the vehicle, while securing a necessary sound pressure. It should be noted that FIG. 9 is a diagram illustrating one example of a frequency characteristic of a synthesized sound that is output from vehicle 40.

In addition, according to vehicle proximity notification device 10, the third sound pressure is adjusted to 0. According to this, it is possible to effectively reduce an unpleasant feeling given to a person inside the vehicle.

In addition, according to vehicle proximity notification device 10, first frequency F1 and second frequency F2 are mutually nonadjacent frequencies among a plurality of frequencies divided for each one-third octave. According to this, it is possible to effectively output a warning sound to a surrounding area of the vehicle.

[1-3. Variation 1]

It has been described in the above-described embodiment that vehicle proximity notification device 10 reduces the sound pressure of a warning sound in the low frequency domain when the predefined-range sound exceeds first threshold Th1. However, vehicle proximity notification device 10 may reduce the sound pressure of a warning sound in the low frequency domain even when the predefined-range sound is lower than or equal to first threshold Th1. In other words, this variation differs from the embodiment in the determination processing performed by determiner 113 and the adjustment processing performed by adjuster 115. Accordingly, the following describes the details of the determination processing and the adjustment processing according to this variation.

Figure 10:
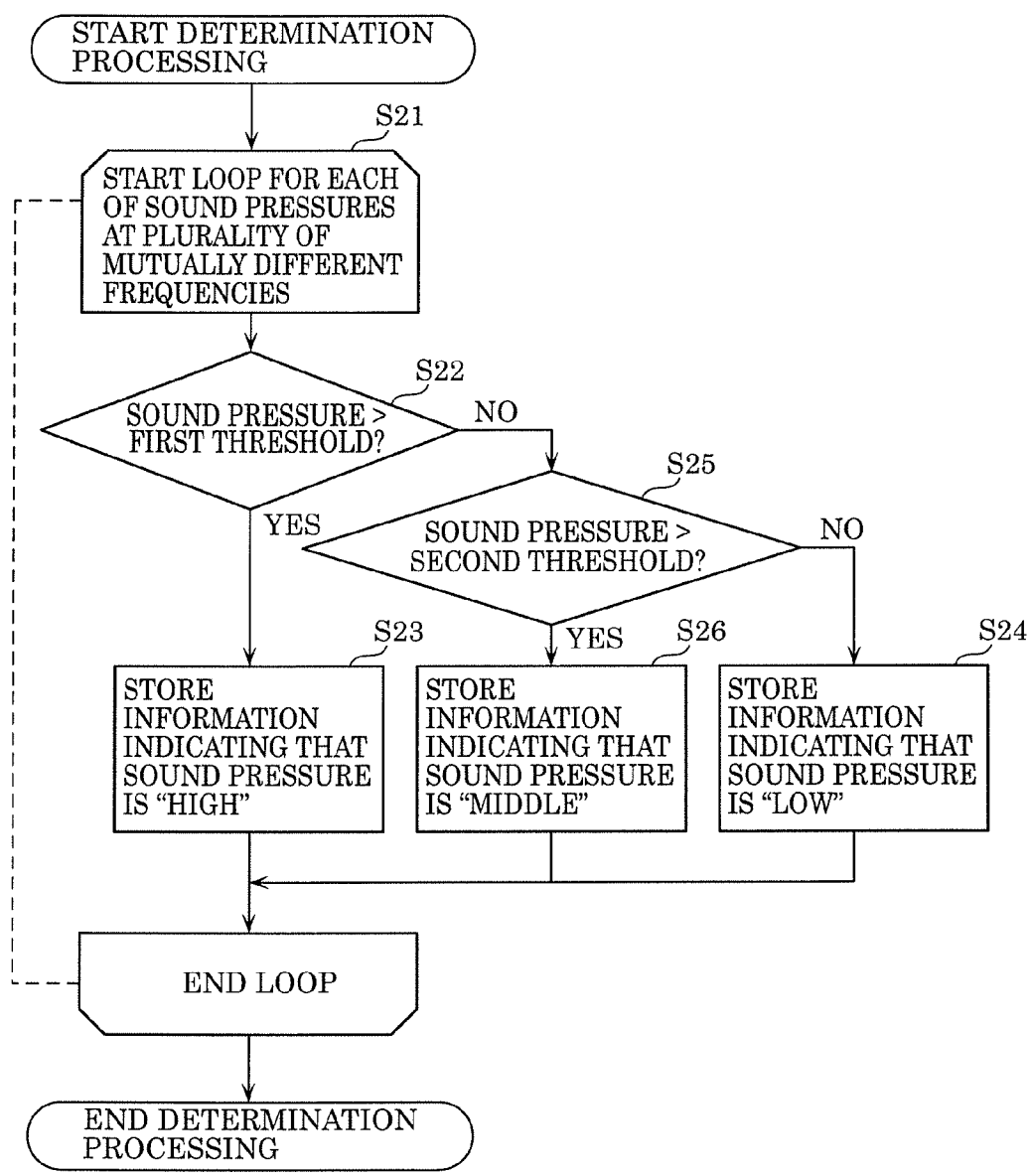
FIG. 10 is a flowchart illustrating the details of determination processing performed by a determiner according to a variation of the embodiment.

FIG. 10 is a flowchart illustrating the details of determination processing performed by determiner 113 according to Variation of the embodiment.

The determination processing according to Variation 1 differs from the determination processing according to the embodiment in that Step S25 and Step S26 are further included to be executed. It should be noted that the processes of Step S21 to Step S24 are equivalent to those of the determination processing in the embodiment, and thus the detailed description for these processes are omitted in the following description.

When it is determined that the sound pressure at one frequency is lower than or equal to first threshold Th1 (No in S22), determiner 113 further determines whether the sound pressure at the one frequency exceeds second threshold Th2 that is lower than first threshold Th1 (S25).

When it is determined that the sound pressure at the one frequency exceeds second threshold Th2 (Yes in S25), determiner 113 stores information indicating that the sound pressure at the one frequency is "middle" (S26). In other words, in this case, determiner 113 stores, as information indicating that the sound pressure at the one frequency is "middle", information indicating that the sound pressure at the one frequency is higher than second threshold Th2 and lower than or equal to first threshold Th1.

On the other hand, when it is determined that the sound pressure at one frequency is lower than or equal to second threshold Th2 (No in S25), determiner 113 performs Step S24.

Determiner 113 repeats Step S21 to Step S26 for a sound pressure at the next frequency for which the determination processing has not yet been performed among the sound pressures at the plurality of frequencies. When Step S21 to Step S26 have been performed on the sound pressures of all of the frequencies, determiner 113 terminates the loop to end the determination processing.

Figure 11:
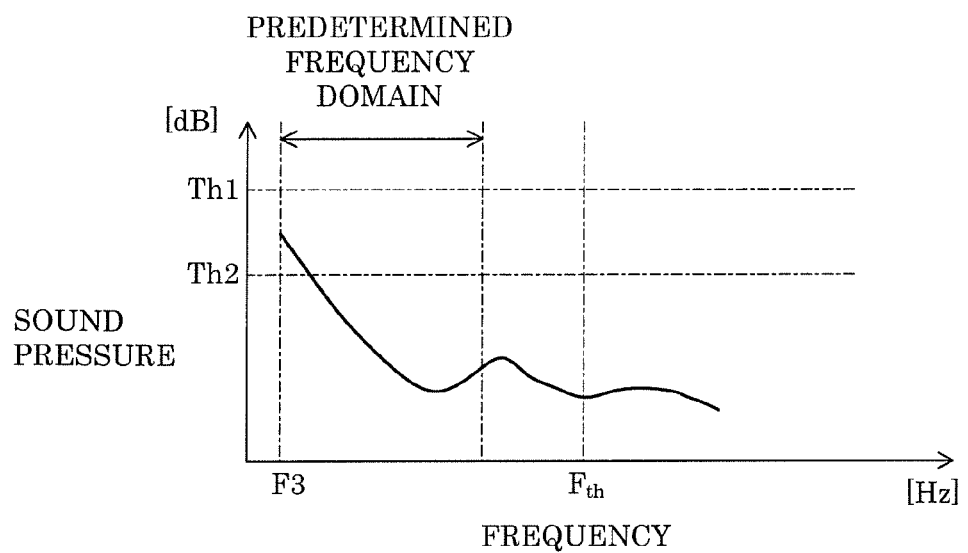
FIG. 11 is a diagram illustrating one example of a frequency characteristic of the fourth sound.

As described above, determiner 113 further determines whether a fourth sound exceeds second threshold Th2 in a predetermined frequency domain. For example, when the fourth sound has a frequency characteristic illustrated in FIG. 11, determiner 113 determines that a sound pressure of the fourth sound exceeds second threshold Th2 and is lower than or equal to first threshold Th1 in the predetermined frequency domain of the fourth sound. It should be noted that FIG. 11 is a diagram which illustrates one example of a frequency characteristic of a fourth sound.

It should be noted that, although it has been described that determiner 113 repeats Step S21 to Step S26 for each of sound pressures at the plurality of frequencies, the operation performed by determiner 113 is not limited to this example, and determiner 113 may determine whether a maximum value of a sound pressure (i) exceeds first threshold Th1, (ii) is higher than second threshold Th2 and is lower than or equal to first threshold Th1, or (iii) is lower than or equal to second threshold Th2, in a predetermined frequency domain.

Next, the adjustment processing according to this variation will be described.

Figure 12:
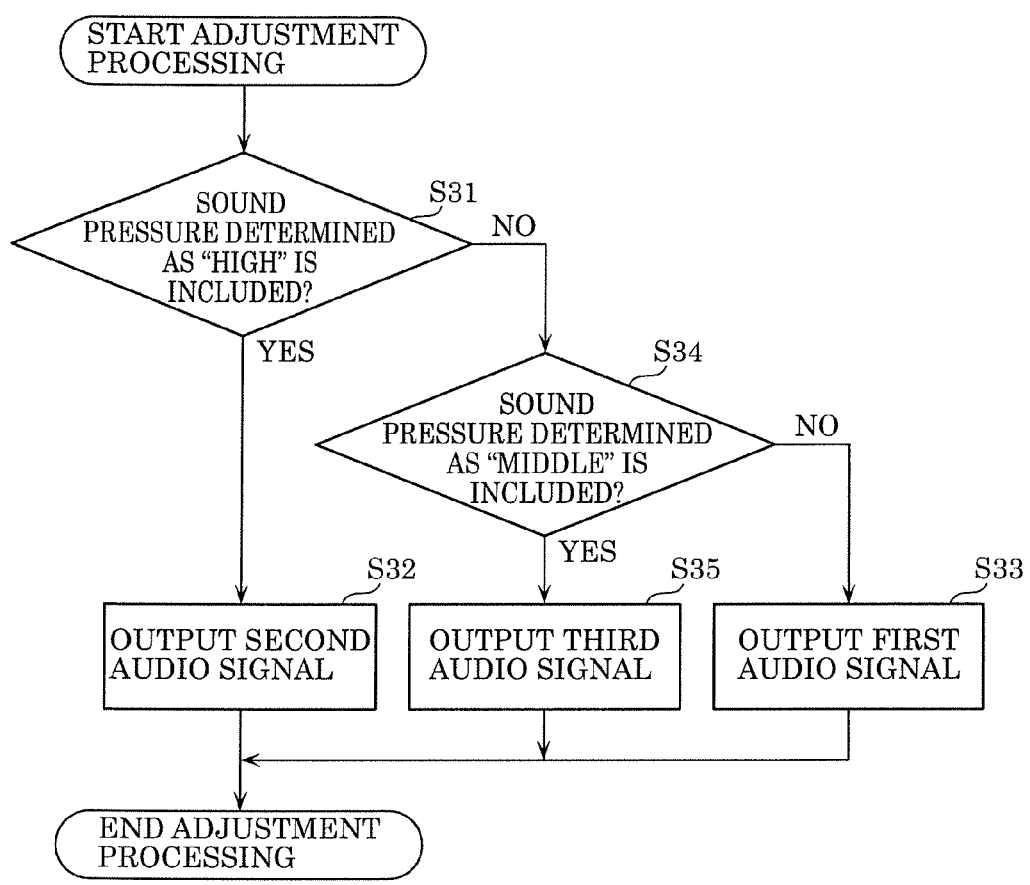
FIG. 12 is a flowchart illustrating the details of adjustment processing performed by adjuster 115 according to the variation of the embodiment.

FIG. 12 is a flowchart illustrating the details of the adjustment processing performed by adjuster 115 according to the variation of the embodiment.

The adjustment processing according to Variation 1 differs from the adjustment processing according to the embodiment in that Step S34 and Step S35 are further included to be executed. It should be noted that the processes of Step S31 to Step S33 are equivalent to those of the adjustment processing in the embodiment, and thus the detailed description for these processes are omitted in the following description.

When adjuster 115 determines that a sound pressure determined as "high" is not included (No in S31), that is, when determiner 113 has determined that the sound pressure of the predefined-range sound is lower than or equal to first threshold Th1, adjuster 115 determines whether a sound pressure determined as "middle" is included in the results of determination performed by determiner 113 (S34). In other words, when determiner 113 has determined that the sound pressure of the predefined-range sound is lower than or equal to first threshold Th1, adjuster 115 determines whether determiner 113 has determined that the sound pressure of the predefined-range sound exceeds second threshold Th2 or determiner 113 has determined that the sound pressure of the predefined-range sound is lower than or equal to second threshold Th2.

Figure 13:
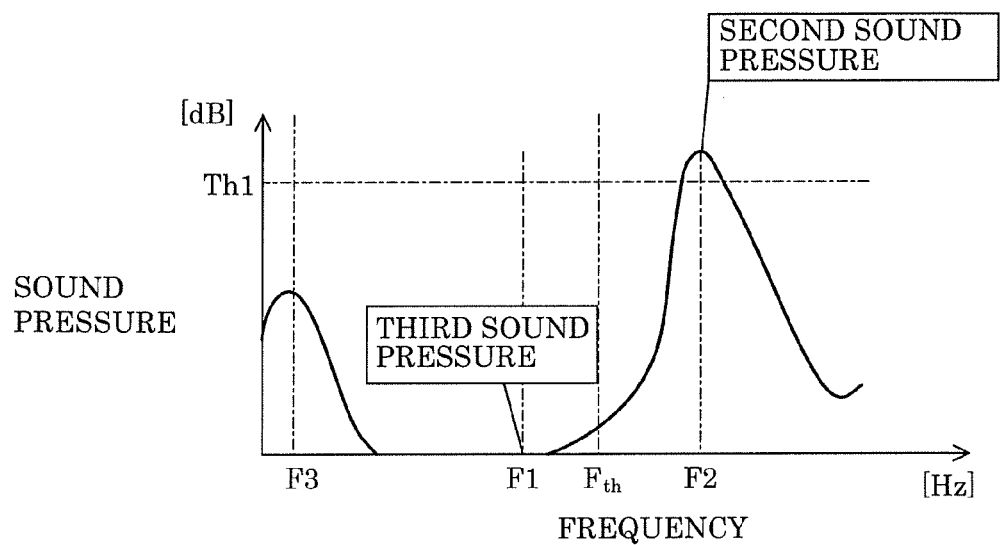
FIG. 13 is a diagram illustrating one example of a third frequency characteristic of the third sound.

When adjuster 115 determines that a sound pressure determined as "middle" is included (Yes in S34), that is, when determiner 113 has determined that the sound pressure of the predefined-range sound exceeds second threshold Th2 and is lower or equal to first threshold Th1, adjuster 115 obtains the first audio signal from sound source 114, generates a third audio signal based on the obtained first audio signal, and outputs the generated third audio signal (S35). More specifically, adjuster 115 (i) adjusts, using the first audio signal, the sound pressure at first frequency F1 associated with the first frequency characteristic of the first sound indicated by the first audio signal to the third sound pressure that is lower than the first sound pressure, and (ii) adjusts, using the adjusted audio signal, the sound pressure at the frequency of the sound pressure that has been determined as "middle" (i.e., the third frequency) to be high, thereby generating the third audio signal indicating the third sound having the third frequency characteristic. In other words, the third frequency characteristic of the third sound is, as illustrated in FIG. 13, a frequency characteristic that is obtained as a result of the sound pressure at first frequency F1 associated with the first frequency characteristic being adjusted to the third sound pressure that is lower than the first sound pressure, and the sound pressure at the third frequency being adjusted to a sound pressure higher than the first frequency characteristic. It should be noted that the third sound pressure resulting from the adjustment performed on the first sound pressure by adjuster 115 may be 0. In addition, the sound pressure at the third frequency after the adjustment performed by adjuster 115 may be lower than first threshold Th1. It should be noted that FIG. 13 is a diagram illustrating one example of the third frequency characteristic of the third sound.

In this manner, when it is determined by determiner 113 that the sound pressure of the predefined-range sound is lower than or equal to first threshold Th1 and exceeds second threshold Th2 that is lower than first threshold Th1, adjuster 115 causes speaker 30 to output, as the warning sound, a sound in which (i) a sound pressure at first frequency F1 is adjusted to a third sound pressure, and (ii) a sound pressure at a third frequency is adjusted to a level higher than the sound pressure at the third frequency when it is determined by determiner 113 that the sound pressure of the predefined-range sound is lower than or equal to second threshold Th2, the third frequency being a frequency at which the sound pressure of the predefined-range sound exceeds second threshold Th2

According to this, in the case where a sound pressure at the third frequency is between second threshold Th2 and the first threshold Th1, since a sound generated as a result of travelling of vehicle 40 is insufficient, a sound with a sound pressure that is increased until a sound pressure of a sound obtained by combining the sound generated as a result of travelling of vehicle 40 and the sound output from the speaker exceeds first threshold Th1 is output, and thereby it is possible to generate a sound having a sufficient sound pressure from the vehicle. Accordingly, it is possible to reduce a sound pressure of a warning sound output from speaker 30 by the amount corresponding to a sound generated from vehicle 40. According to this, it is possible to effectively reduce an unpleasant feeling given to a person inside the vehicle, while securing a necessary sound pressure.

[1-4. Others]

Vehicle proximity notification device 10 includes filter processer 112 according to the above-described embodiment and the variation thereof. However, vehicle proximity notification device 10 need not necessarily include filter processer 112.

More specifically, controller 11 may determine whether a sound pressure of a sound collected by microphone 20 exceeds first threshold Th1 in a low frequency domain that is a range of frequencies lower than a predetermined frequency. Then, controller 11 may cause speaker 30 to output, as a warning sound, a first sound when it is determined that the sound pressure of the sound collected by microphone 20 is lower than or equal to first threshold Th1 in the low frequency domain, and may cause speaker 30 to output, as the warning sound, a second sound when it is determined that the sound pressure of the sound collected by microphone 20 exceeds first threshold Th1 in the low frequency domain.

In addition, for example, in the sound collected by microphone 20, a range in which a sound pressure greatly changes according to travelling of vehicle 40 may be regarded as a sound that is generated from vehicle 40 other than the sound output from speaker 30.

In addition, although it has been described that adjuster 115 generates the second audio signal or the third audio signal based on the first audio signal according to the above-described embodiment and the variation thereof, the vehicle proximity notification device according to the present disclosure is not limited to this example. For example, the second audio signal or the third audio signal may be generated and stored in advance by sound source 114. In this case, adjuster 115 selects one of the first audio signal, the second audio signal, and the third audio signal from sound source 114, and causes speaker 30 to output a selected one of the audio signals.

In addition, although it has been described that whether a sound collected by microphone 20 exceeds the first threshold in the low frequency domain, and reduces a sound pressure of a sound to be output from speaker 30 when the sound collected by microphone 20 exceeds the first threshold in the low frequency domain, according to the above-described embodiment and the variation thereof, the vehicle proximity notification device according to the present disclosure is not limited to this example. For example, whether the sound collected by microphone 20 exceeds the first threshold in any of frequency domains may be determined, and the sound pressure of the sound to be output by speaker 30 may be reduced when the sound collected by microphone 20 exceeds the first threshold in any of frequency domains.

In addition, each of the structural components in the above-described embodiment may be configured in the form of a dedicated hardware product, or may be realized by executing a software program suitable for the structural components. Each of the structural components may be realized by means of a program executing unit, such as a central processing unit (CPU) and a processor, reading and executing the software program recorded on a recording medium such as a hard disk or a semiconductor memory.

In addition, each of the structural components may be a circuitry (or an integrated circuit). The circuitries may be configured as a single circuitry as a whole or may be mutually different circuitries. Furthermore, these circuitries may be each a general purpose circuitry or a dedicated circuitry.

It should be noted that these generic and specific aspects may be implemented using a system, an apparatus, a method, an integrated circuit, a computer program, or a non-transitory computer-readable recording medium such as a compact disc read only memory (CD-ROM). Alternatively, these generic and specific aspects may also be implemented by any combination of systems, apparatuses, methods, integrated circuits, computer programs, and non-transitory computer-readable recording medium.

For example, the present disclosure may be implemented as a vehicle proximity notification method executed by a vehicle proximity notification device (a computer or a DSP), or may be implemented as a program for causing a computer or a DSP to execute the above-described vehicle proximity notification method.

In addition, in the above-described embodiment, processing executed by a specific processing unit may be executed by a different processing unit. In addition, the order of processes performed by the vehicle proximity notification device described in the above-described embodiment may be changed, and the processes may be executed in parallel.

Moreover, embodiments obtained through various modifications to the embodiment which may be conceived by a person skilled in the art as well as embodiments realized by arbitrarily combining the structural components and functions of the embodiment without materially departing from the principles and spirit of the present disclosure are included in the present disclosure.

While an embodiment has been described herein above, it is to be appreciated that various changes in form and detail may be made without departing from the spirit and scope of the present disclosure as presently or hereafter claimed.

Further Information about Technical Background to the Application

The disclosures of the following PCT International Application and Japanese Patent Application including specification, drawings and claims are incorporated herein by references on their entirety: PCT International Application No. PCT/JP2018/031520 filed on Aug. 27, 2018 and Japanese Patent Application No. 2017-180782 filed on Sep. 21, 2017.

INDUSTRIAL APPLICABILITY

The present disclosure is applicable to a vehicle proximity notification device mounted in a low-noise vehicle, etc. such as an electric vehicle and a hybrid vehicle.

What is claimed is:

1. A vehicle proximity notification device that notifies proximity of a vehicle by causing a speaker disposed outside a vehicle interior of the vehicle to output a warning sound, the vehicle proximity notification device comprising:
 a processor that,
 when a sound pressure of a sound collected by a microphone disposed outside the vehicle interior exceeds a first threshold, sets a sound pressure of the warning sound output by the speaker to a level lower than the sound pressure of the warning sound output by the speaker when the sound pressure of the sound collected by the microphone is lower than or equal to the first threshold;
 determines whether the sound pressure of the sound collected by the microphone exceeds the first threshold in a low frequency domain that is a range of frequencies lower than a predetermined frequency;
 when it is determined that the sound pressure of the sound collected by the microphone is lower than or equal to the first threshold in the low frequency domain, causes the speaker to output, as the warning sound, a first sound having a first frequency characteristic which is that a sound pressure at a first frequency included in the low frequency domain is a first sound pressure and a sound pressure at a second frequency included in a high frequency domain is a second sound pressure, the high frequency domain being a range of frequencies higher than or equal to the predetermined frequency; and
 when it is determined that the sound pressure of the sound collected by the microphone exceeds the first threshold in the low frequency domain, causes the speaker to output, as the warning sound, a second sound having a second frequency characteristic which is that the sound pressure at the first frequency associated with the first frequency characteristic is adjusted to a third sound pressure that is lower than the first sound pressure.

2. A vehicle proximity notification device that notifies proximity of a vehicle by causing a speaker disposed outside a vehicle interior of the vehicle to output a warning sound, the vehicle proximity notification device comprising:
a processor that,
when a sound pressure of a sound collected by a microphone disposed outside the vehicle interior exceeds a first threshold, sets a sound pressure of the warning sound output by the speaker to a level lower than the sound pressure of the warning sound output by the speaker when the sound pressure of the sound collected by the microphone is lower than or equal to the first threshold;
filters the sound collected by the microphone to extract a predefined-range sound removed of a frequency domain in which the sound pressure of the warning sound exceeds a predetermined sound pressure;
determines whether a sound pressure of the predefined-range sound exceeds the first threshold;
when it is determined that the sound pressure of the predefined-range sound is lower than or equal to the first threshold, causes the speaker to output, as the warning sound, a first sound having a first frequency characteristic which is that a sound pressure at a first frequency included in a low frequency domain is a first sound pressure and a sound pressure at a second frequency included in a high frequency domain is a second sound pressure, the low frequency domain being a range of frequencies lower than a predetermined frequency, the high frequency domain being a range of frequencies higher than or equal to the predetermined frequency; and
when it is determined that the sound pressure of the predefined-range sound exceeds the first threshold, causes the speaker to output, as the warning sound, a second sound having a second frequency characteristic which is that the sound pressure at the first frequency associated with the first frequency characteristic is adjusted to a third sound pressure that is lower than the first sound pressure.

3. The vehicle proximity notification device according to claim 2, wherein
the processor, when it is determined that the sound pressure of the predefined-range sound is lower than or equal to the first threshold and exceeds a second threshold that is lower than the first threshold, causes the speaker to output, as the warning sound, a sound in which (i) a sound pressure at the first frequency is adjusted to the third sound pressure, and (ii) a sound pressure at the third frequency is adjusted to a level higher than the sound pressure at the third frequency when it is determined that the sound pressure of the predefined-range sound exceeds the first threshold, the third frequency being a frequency at which the sound pressure of the predefined-range sound exceeds the second threshold.

4. The vehicle proximity notification device according to claim 1, wherein
the third sound pressure is 0.

5. The vehicle proximity notification device according to claim 1, wherein
the first frequency and the second frequency are mutually nonadjacent frequencies among a plurality of frequencies determined at one-third octave intervals.

6. A vehicle proximity notification method performed by a vehicle proximity notification device that notifies proximity of a vehicle by causing a speaker disposed outside a vehicle interior of the vehicle to output a sound, the vehicle proximity notification method comprising:
obtaining a sound collected by a microphone disposed outside the vehicle interior;
determining, by a processor of the vehicle proximity notification device, whether a sound pressure of the sound obtained exceeds a first threshold;
when it is determined that the sound pressure of the sound obtained exceeds the first threshold, setting, by the processor, a sound pressure of the sound output by the speaker to a level lower than the sound pressure of the sound output by the speaker when it is determined that the sound pressure of the sound obtained is lower than or equal to the first threshold;
determining, by the processor, whether the sound pressure of the sound collected by the microphone exceeds the first threshold in a low frequency domain that is a range of frequencies lower than a predetermined frequency;
when it is determined that the sound pressure of the sound collected by the microphone is lower than or equal to the first threshold in the low frequency domain, causing the speaker to output by the processor, as the warning sound, a first sound having a first frequency characteristic which is that a sound pressure at a first frequency included in the low frequency domain is a first sound pressure and a sound pressure at a second frequency included in a high frequency domain is a second sound pressure, the high frequency domain being a range of frequencies higher than or equal to the predetermined frequency; and
when it is determined that the sound pressure of the sound collected by the microphone exceeds the first threshold in the low frequency domain, causing the speaker to output by the processor, as the warning sound, a second sound having a second frequency characteristic which is that the sound pressure at the first frequency associated with the first frequency characteristic is adjusted to a third sound pressure that is lower than the first sound pressure.

\* \* \* \* \*